H. SORLEY.
AEROPLANE.
APPLICATION FILED JULY 15, 1916.

1,269,871.

Patented June 18, 1918.
13 SHEETS—SHEET 3.

WITNESSES

INVENTOR
Hartvig Sorley
BY
ATTORNEY

H. SORLEY.
AEROPLANE.
APPLICATION FILED JULY 15, 1916.

1,269,871.

Patented June 18, 1918.
13 SHEETS—SHEET 5.

WITNESSES

INVENTOR
Hartvig Sorley
BY
ATTORNEY

H. SORLEY.
AEROPLANE.
APPLICATION FILED JULY 15, 1916.

1,269,871.

Patented June 18, 1918.
13 SHEETS—SHEET 11.

WITNESSES

INVENTOR
Hartvig Sorley
BY
ATTORNEY

H. SORLEY.
AEROPLANE.
APPLICATION FILED JULY 15, 1916.

1,269,871.

Patented June 18, 1918.
13 SHEETS—SHEET 13.

INVENTOR
Hartvig Sorley
BY
Richard B. Owen
ATTORNEY

WITNESSES

UNITED STATES PATENT OFFICE.

HARTVIG SORLEY, OF MACOMB, ILLINOIS.

AEROPLANE.

1,269,871. Specification of Letters Patent. Patented June 18, 1918.

Application filed July 15, 1916. Serial No. 109,531.

*To all whom it may concern:*

Be it known that I, HARTVIG SORLEY, a subject of the King of Norway, residing at Macomb, in the county of McDonough and State of Illinois, have invented certain new and useful Improvements in Aeroplanes, of which the following is a specification.

My invention has reference to machines for aerial flight and particularly to that type of machine for this purpose which is known as the aeroplane and wherein the flight is of a dynamic nature.

One object of the present invention resides in presenting a machine of this character which embodies the usual plane structure providing the supporting surfaces and, in addition thereto has automatically controlled stabilizing mechanism for regulating and damping the tendency of the machine to oscillate about its longitudinal axis.

A further object resides in providing mechanism whereby the lateral direction of flight may be controlled.

Another object consists in providing mechanism for regulating the longitudinal stability of the machine.

With the above and other objects in view, I will now proceed to describe a specific embodiment of the present invention, which I have shown by way of illustration only, wherein.

In detail:

The aeroplane, as herein shown, comprises a number of separate entities which coact one with the other to form a complete operative machine capable of taking flight and the separate entities will hereinafter be designated and described in the order as below enumerated.

A is the plane structure and framework forming the supporting body of the machine.

B is the propelling mechanism.

C is the stabilizing mechanism.

D is the flight controlling mechanism, and

E is the alighting and running frame mechanism.

Now, with reference firstly to the plane structure A of the machine and its framework, the latter comprises the longitudinally extending frame members 1, 2, 3 and 4, the middle two, 2 and 3 of which extend to the rear of the machine and form the tail thereof. These frame members are crossed on the bottom by the transversely extending tracks 5 and 6 which are primarily for a purpose to be hereinafter set forth, but which serve the secondary purpose of a reinforcing means to space apart the frame members 1 to 4 inclusive. The frame is reinforced by the angularly directed stays 6' and 7 and the struts 8 and 9 connecting respectively with the stays 6' and 7. Also the usual bracing wires 10 and 11 on each side and on the top extend from front to rear of the frame and are crossed at suitable points and connected with the frame at a plurality of points and suitably disposed with respect to the frame member so as to thoroughly tension the machine throughout its length and breadth. The vertical members 12 serve further to re-inforce and impart rigidity to the machine.

The members 2 and 3 converge from the front toward the rear and at the rear are covered with silk, sheet aluminum or any other suitable material to form a tail channel 13.

Intermediate the framework of the machine and at the top of the frame members 2 and 3 is carried a plane or supporting surface 14 which is positioned forwardly of the center of the machine; backwardly of the said plane 14 and spaced from each other and carried at the bottom of the frame members 2 and 3 are planes 15 and 16. The planes 14, 15 and 16 are fixed in their respective positions and form the fixed supporting surfaces of the aeroplane. This completes the body structure of the aeroplane and next in order will be described the propelling mechanism B thereof.

The propelling mechanism of the machine is mounted in the framework hereinbefore described, a flooring 17 being provided for that purpose and accommodating the heavier parts of the propelling mechanism such as the prime mover 18 which may be of the internal combustion engine type. The propelling mechanism comprises essentially four propellers, two of which are located forwardly as indicated at 19 and 20 and are of the helicoidal type and the others of which are indicated at 21 and 22 and are located aft of the machine and are of the screw bladed type. The internal combustion engine 18 has its shaft connected with a driving member 23 of a clutch, the driven member of which is indicated at 24 and carries a bevel gear 25 fixed to a shaft 26. Disposed at right angles to the shaft 26 and extending in opposite alined relation are two shafts 27 and 28 carrying at their adjacent ends the bevel gears 29 and 30 respectively meshing with the bevel gear 25 and therefore the said shafts 27 and 28, when the clutch members are in engagement, are in driven relation with the prime mover. The clutch members are controlled through the connections 30' operated from a lever 31 hung in a suitable rack 32 and thus energy of the prime mover may be controlled to the best advantage.

The shafts 27 and 28 carry at their non-adjacent ends the bevel gears 33 each of which meshes with a bevel gear 34 on the longitudinally extending shafts 35 which, at their rear ends carry the bladed screw propellers 21 and 22, and at their forward ends are provided with pinions 37. Parallel with the shafts 35 and extending forwardly therefrom, are jack shafts 39, which carry gears 40 meshing with pinions 41 fixed upon intermediate gears 42, the latter being in mesh with the pinions 37. The forward ends of the shafts 39 carry gears 46 which mesh with peripheral gears 47 carried by the helicoidal propellers 19 and 20. The gears 46 are rotatably mounted upon the shafts 39, being held against longitudinal movement thereon, by the collars 41' and 42', secured to the shafts by pins 43. A ratchet portion 38 is formed on each gear 46, and pawls 44 carried by one of the collars are held yieldably engaged with the ratchet teeth by springs 45. This arrangement permits of a driving connection being established between the peripheral gears 47 and the shafts 39 only when the former is rotating in one direction, and when the propellers 19 and 20 rotate the gears 46 at a greater speed than the speed transmitted from the prime mover to the shafts 39, the pawl and ratchet arrangements at once connect the propeller shafts 35 with the helicoidal gears 47, and the said shafts are driven directly from the helicoidal propellers. From this construction, it is seen that should the prime mover fail while the aeroplane is in flight, the friction of air against the helicoidal propellers 19 and 20, due to the momentum of the machine, will develop driving power in the propeller shafts 35, whereby forward movement of the machine may be obtained. It is also obvious that the arrangement through the driving propellers forces air rearwardly, whereby resistance to the helicoidal propellers is reduced. In this way, also, the head on resistance of the machine is materially lessened should the wind be high. The shafts 35 and 39 are journaled in cross members 49, which are reinforced by the vertical members 50, whereby a firm and rigid foundation for the driving mechanism is provided.

The stabilizing mechanism C of the machine which is so constructed as to preserve lateral stability and obviate the tendency of the aeroplane to oscillate about its longitudinal axis, comprises the planes 51 and 52, which are of the same dimensions as the planes 14, 15 and 16 but are mounted on the laterally extending tracks 5 and 6 and are shiftable, as will be hereinafter described. The tracks 5 and 6 comprise channel members having flanges 53 and 54 which accommodate bearing members designated as a whole by the numeral 55. These members are carried by the edges of the planes 51 and 52, and each comprises two side members 56 and 57 which are connected by the reversely positioned angle bars 58 and 59 riveted or otherwise secured together at 60, and secured to the side members as shown at 61 and 62 respectively. Journaled on the side members 56 and 57 and rotatable in a vertical plane are the bearing rollers 63 and 64, which ride on flanges 53 and 54, and intermediate the sides 56 and 57 are the rollers 65 journaled on vertical axes 66 and for contact with the bases 67 of the channel members forming the tracks. Thus the shifting of the lateral planes 51 and 52 is made exceptionally facile due to the fact that the friction is diminished to a minimum by reason of its bearing construction, whereby a rolling surface is presented to each side of the channel members forming the tracks.

The said planes 51 and 52 have secured or fixed thereto the laterally extending racks 68 and 69 respectively, which mesh with gears 70 and 71 fixed to a longitudinally extending shaft 72 journaled in the members 73 and 74 dependent from the tracks 5 and 6 respectively and supported and reinforced by the structures 75 and 76, the former of which has formed therein an arcuate guide-way 77 which accommodates a shifting weight 78 provided on its lateral surface with the bearing rollers 79 rotatable in a horizontal plane and bearing on the guide-way 77 whereby the weight shifts by gravity with a minimum of friction. The said weight 78 is dependent on an arm or lever 80 which is suspended from a pivot 81 and supported by braces 82 and the said arm 80 is integral with the journal 83 of a sector 84 which meshes with a pinion 85 fixed to the shaft 72. Thus the tendency of the aeroplane to oscillate about its longitudinal axis during flight will cause the said weight 78 to shift in its arcuate guide 77 and thereby will shift the planes 51 and 52 so as to increase or decrease the area of the supporting surface on either side of the longitudinal axis of the machine depending upon the careening of the aeroplane during flight. Thus by reason of its proportionate variations in the area of the supporting surfaces, the aeroplane is enabled, during flight, to automatically maintain its equi-poise.

The next entity to be considered is the flight controlling mechanism and this comprises both means for controlling the longitudinal course through the air in a vertical plane and the lateral course of the machine.

Considering first the means for controlling the lateral course of the machine, this comprises the rudder G formed by the two vertical members 86 which are connected with the cables 87 and connected together by the cross stay 88 pivoted to each at 89. The cables 87 are crossed as shown at 90 and are led forwardly around the members 91 and again cross at 92 and connected with the vertical side ailerons 93 after having been led around the guide pulleys 94. The said vertical side ailerons are supported on the vertical stays 95 and pivot thereon as shown. A common member 96 connects the two cables 87 and is in turn connected at 97 with the ends of a cable 98 held in triangular formation by the guiding pulleys 99 and wrapped around the post 100 by a steering wheel 101. The said post 100 carries, at its lower end a disk 102 which is affixed thereto and is provided with a plurality of circumferentially spaced apertures 103. In proximity to the said disk 102 is located a bearing post 104 which has pivoted thereto at 105 a lever 106 and carrying at its end a finger 107 for engagement with the apertures 103. At its free end the lever 106 is engaged by a foot actuated member 108 normally held in its upward position by a spring 109 and thereby maintaining the finger 107 in engagement with one of the apertures 103 and by depressing this foot member, it will be seen that the finger 107 will be removed from the aperture with which it engages and by rotation of the wheel 101, the position of the rudders 86 and the vertical ailerons 93 may be varied to suit the course in which it is desired to direct the aeroplane.

The flight control mechanism also consists of means by which the elevation of the aeroplane may be varied and this mechanism consists essentially of two auxiliary surfaces 110 and 111 supported above the planes 14, 15 and 16 and preferably fore and aft of the machine though they extend individually on the machine. These planes 110 and 111 are carried by frameworks 112 and 113 respectively, and comprise spaced parallel planes 112' as shown and arranged at the bottom of said frameworks are gears 114 and 115 pivoted at 116 in the vertical members 117. The vertical members 117 are formed of a plurality of members 118, 119 and 120 respectively, secured resiliently together by the spring bolts 121 surrounded by the springs 122 which are so attached as shown at 123 as to provide a longitudinal slot therein through which an arm 124 may enter and connect with the wedge shaped shoe 125 sliding in the rectangular space 126 and which is constrained to move in a vertical path against the resistance offered by the springs 122. This arm 124 is pivoted at 127 to a second arm or lever 128 which, in turn is pivoted to the vertical member at 129 and is extended therewith and connects at 130 with the framework 112. Thus as the said auxiliary surfaces 110 and 111 are tilted the said shoes 125 are caused to slide against the resistance of the springs 122 and, while the said auxiliary surfaces may be tilted by manual operation, they are, nevertheless, constrained against free movement and the influences of the air currents exerted thereon.

To operate the said auxiliary surfaces 110 and 111 I have provided an auxiliary extending shaft 130 which, adjacent its center carries a bevel gear 131 engaging a second bevel gear 132 carried on a vertical post 133 having at its lower end a hand wheel 134 and adjacent its upper end a disk 135 apertured similar to the disk 102. For engagement with the apertures 136 of the disk 135, I provide a finger 137 which is carried by a rod 138 normally drawn upwardly by the spring 139 and confined beneath the bracket 140 and the collar 141 carried by the said rod 138. The rod 138 may be drawn downwardly by pressing the foot on a foot pedal 142 which is pivoted at 143 to a vertical bearing stand 144 and thus the said wheel 134 may be adjusted similarly to the wheel 101 to set the auxiliary supporting surfaces 110 and 111 in any tilted position. However, to impart motion to the said auxiliary surfaces 110 and 111 special provision must be made to drive the said gears 114 and 115 over the driving shaft 130 and the mechanism for controlling its auxiliary surfaces. Therefore, at each end, the said shaft 130 carries a bevel gear 145 which meshes with bevel gears 146 and 147 on shafts which are paired as designated at 148 and 149, the first mentioned pair 148 extending forwardly of the machine and the latter pair 149 extending rearwardly so that provision is made for simultaneously tilting both of the auxiliary surfaces 110 and 111. At their forward ends the shafts 148 carry bevel gears 150 which mesh with bevel gears 160 carried by the transversely extending shaft 161 having provided thereon pinions 162 which mesh with the gears 114 of the forward auxiliary surface 110. Likewise the shafts 149 carry at the rear ends the gears 163 which mesh with gears 164 carried by the transversely extending shaft 165 which also has affixed thereto the pinions 166 meshing with gears 115 of the aft auxiliary surface 111. Therefore, as the controller wheel 134 is rotated, these auxiliary surfaces may be suitably adjusted to any angle to either elevate the machine or permit it to descend.

Figure 1:
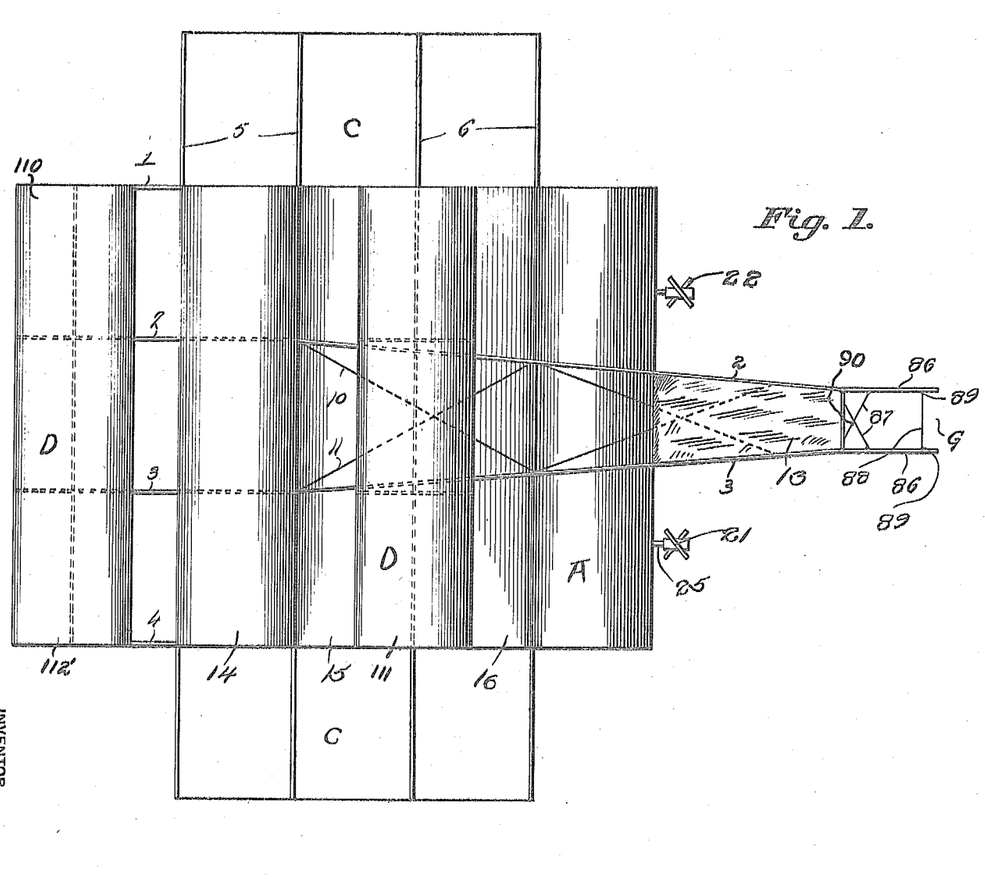
Figure 1 is a top plan view of the aeroplane showing the arrangement of planes.
Figure 2:
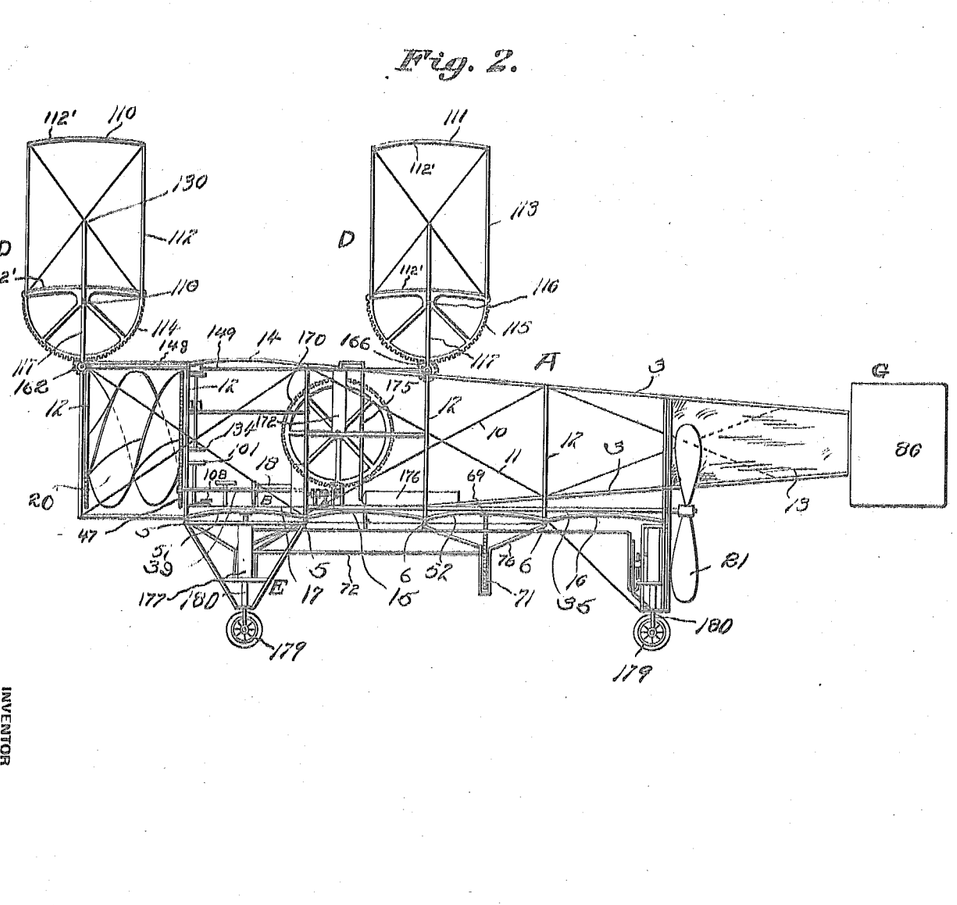
Fig. 2 is a view in side elevation.
Figure 3:
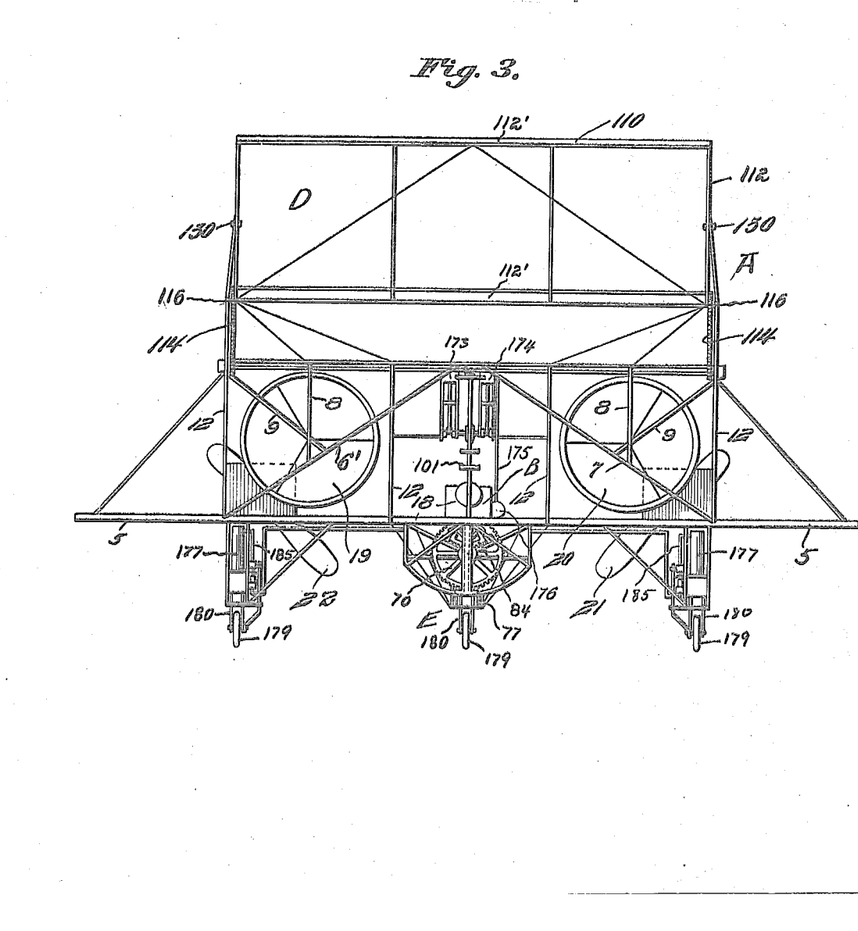
Fig. 3 is a view in front elevation.
Figure 4:
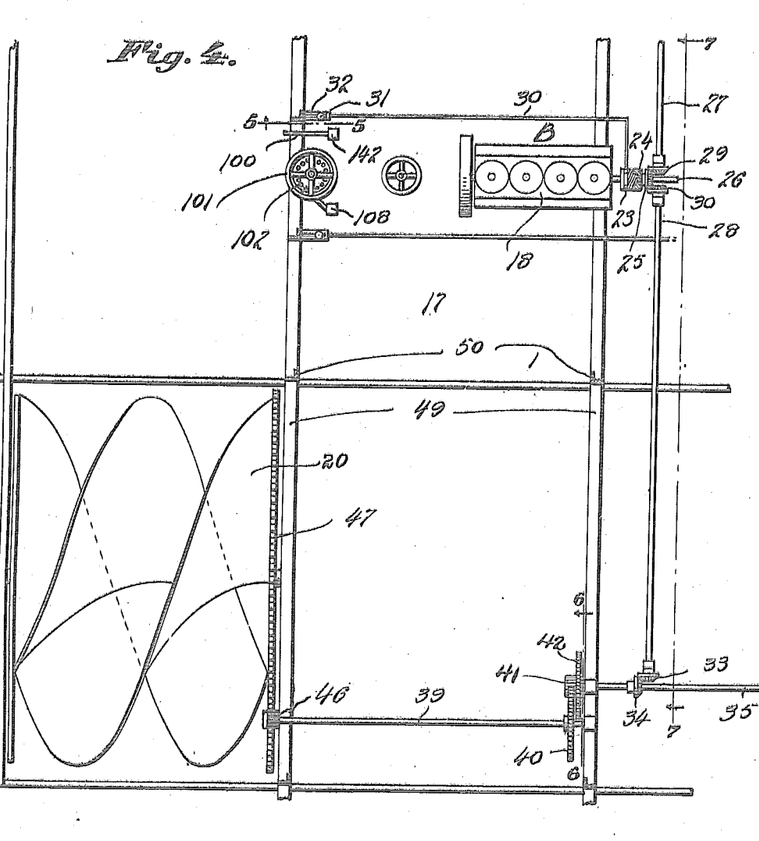
Fig. 4 is a sectional view showing a portion of the aeroplane, and particularly showing the details of the propelling mechanism thereof.
Figure 5:
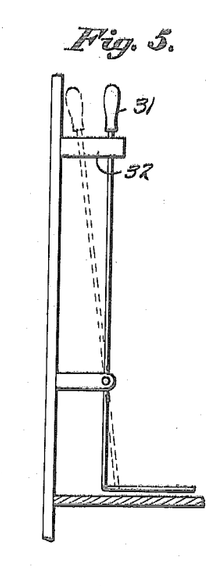
Fig. 5 is a detail sectional view on the line 5—5 of Fig. 4.
Figures 6, 7, 8, 9:
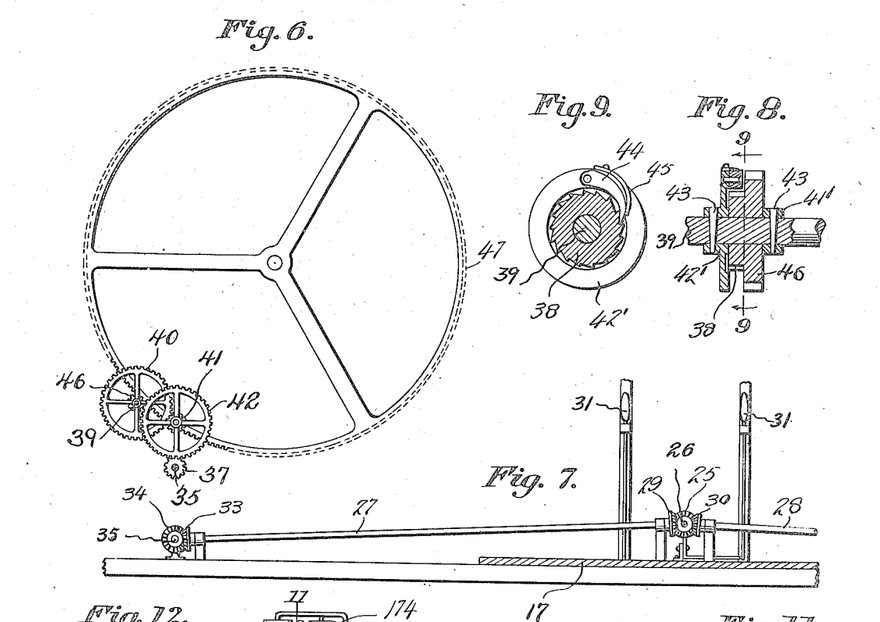
Fig. 6 is a detail sectional view on the line 6—6 of Fig. 4, showing the gearing from the front propellers.
Fig. 7 is a sectional elevation on the line 7—7 of Fig. 4 showing the gearing from the main shaft to the secondary shafts.
Fig. 8 is a detail view in section through the ratchet gear.
Fig. 9 is a section on the line 9—9 of Fig. 8.
Figures 10, 12, 13:
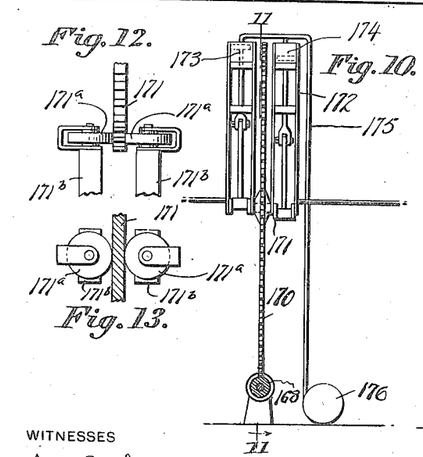
Fig. 10 is a sectional elevation of the compressor mechanism.
Fig. 12 is an enlarged view of a portion of the compressor mechanism showing the guiding means for the large gear.
Fig. 13 is a plan view of the mechanism shown in Fig. 12.
Figure 11:
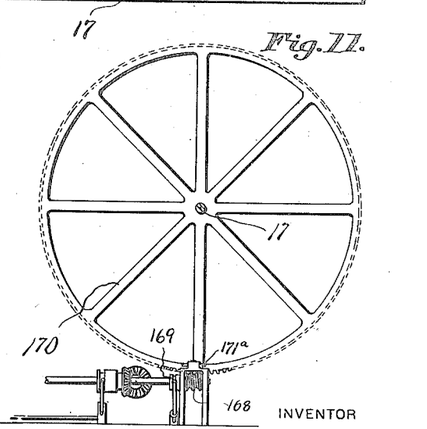
Fig. 11 is a detail section on the line 11—11 of Fig. 10.
Figures 14, 15, 16:
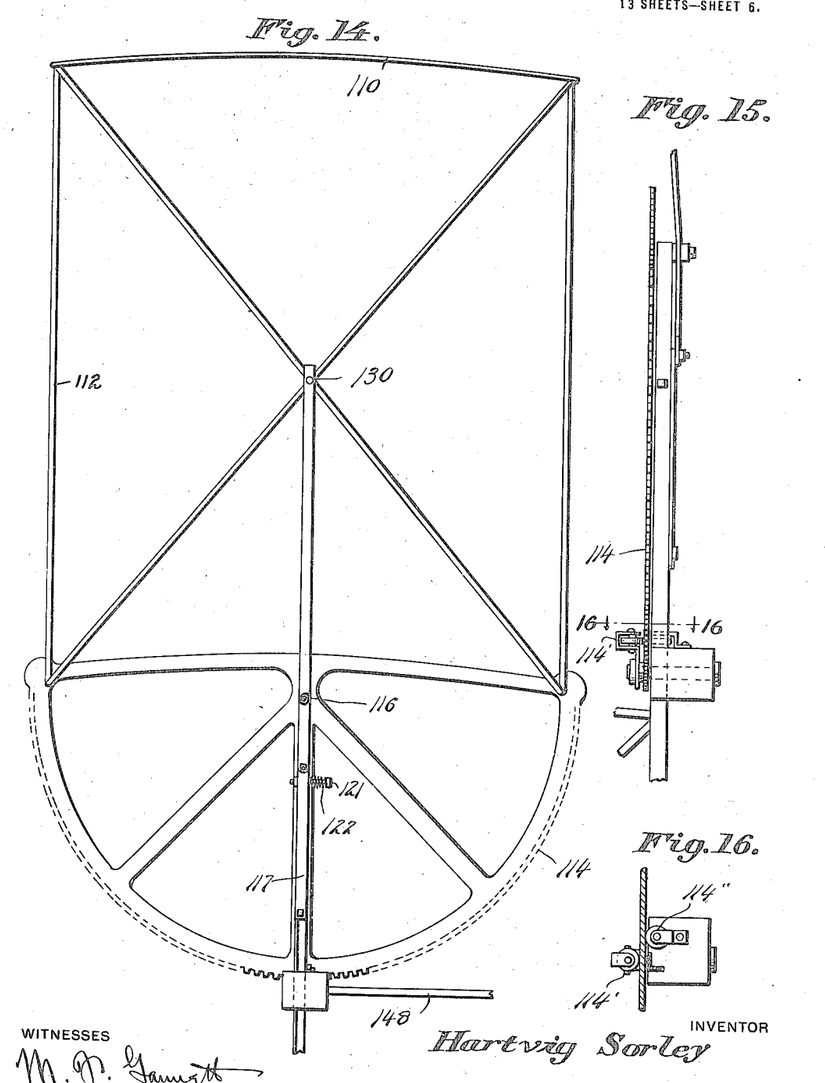
Fig. 14 is a view, in side elevation, of one of the tilting planes.
Fig. 15 is an edge view of said planes.
Fig. 16 is a sectional view on the line 16—16 of Fig. 15.
Figure 17:
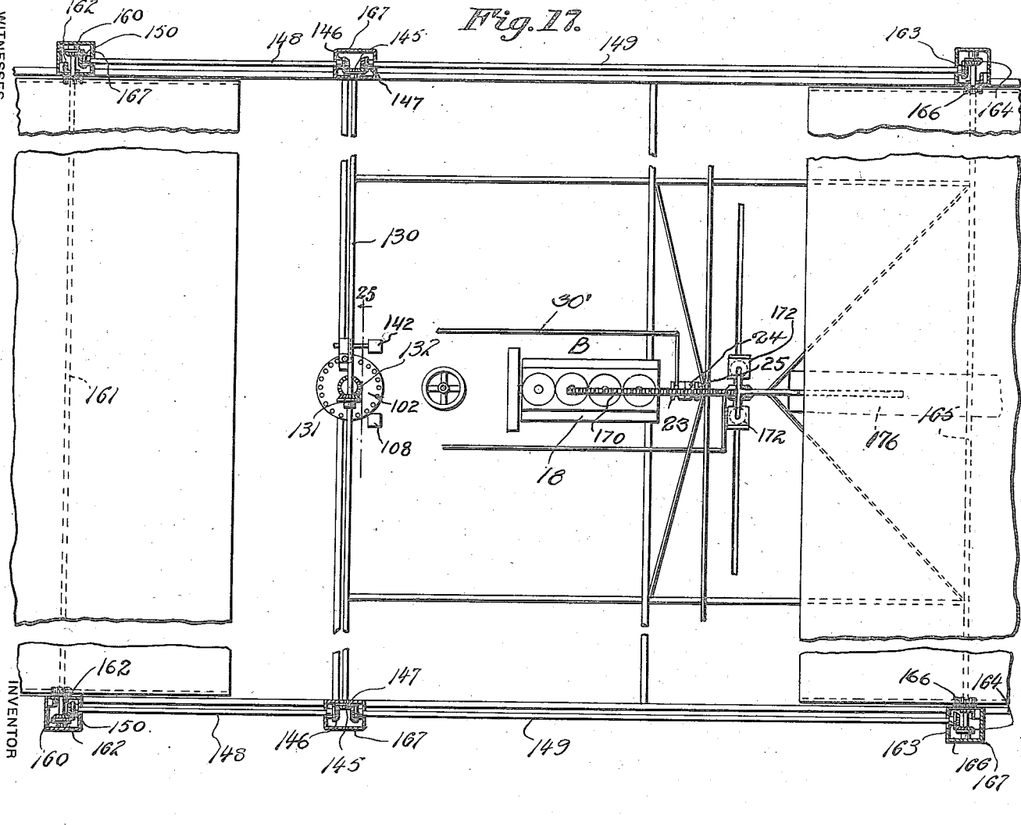
Fig. 17 is a plan view showing the mechanism for operating the tilting planes.
Figure 18:
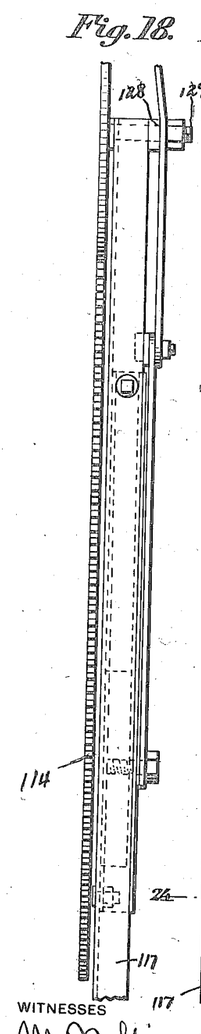
Fig. 18 is an enlarged view similar to Fig. 15.
Figures 19, 20, 21, 23, 24:
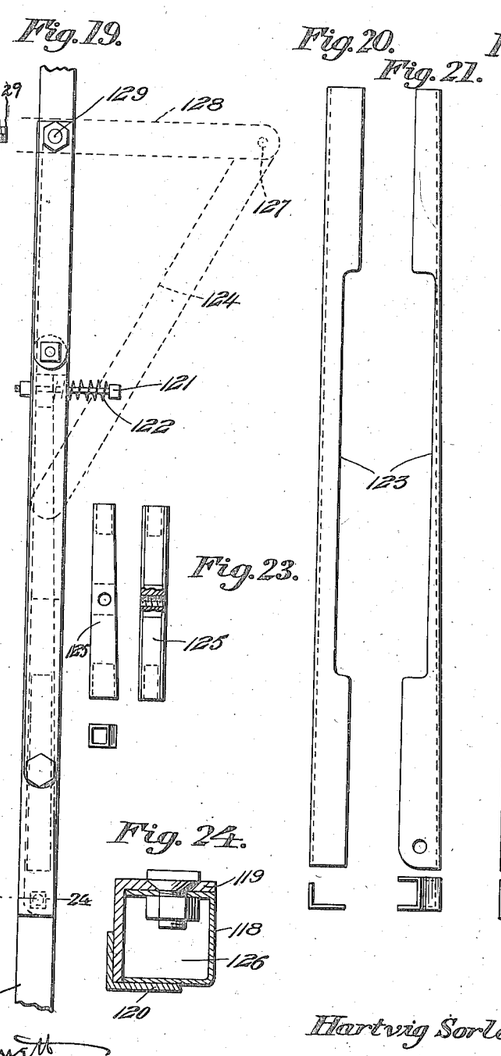
Fig. 19 is a front view of the structure shown in Fig. 15.
Fig. 20 is a view, in elevation, of one of the elements used in constructing the structure shown in Fig. 18.
Fig. 21 is a similar view of another element.
Fig. 23 represents end views of the elements shown in Figs. 20 to 22 inclusive.
Fig. 24 is a sectional view on the line 24—24 of Fig. 19.
Figure 22:
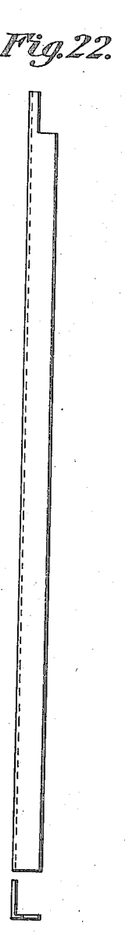
Fig. 22 is a similar view of another element.
Figures 25, 26, 27, 28:
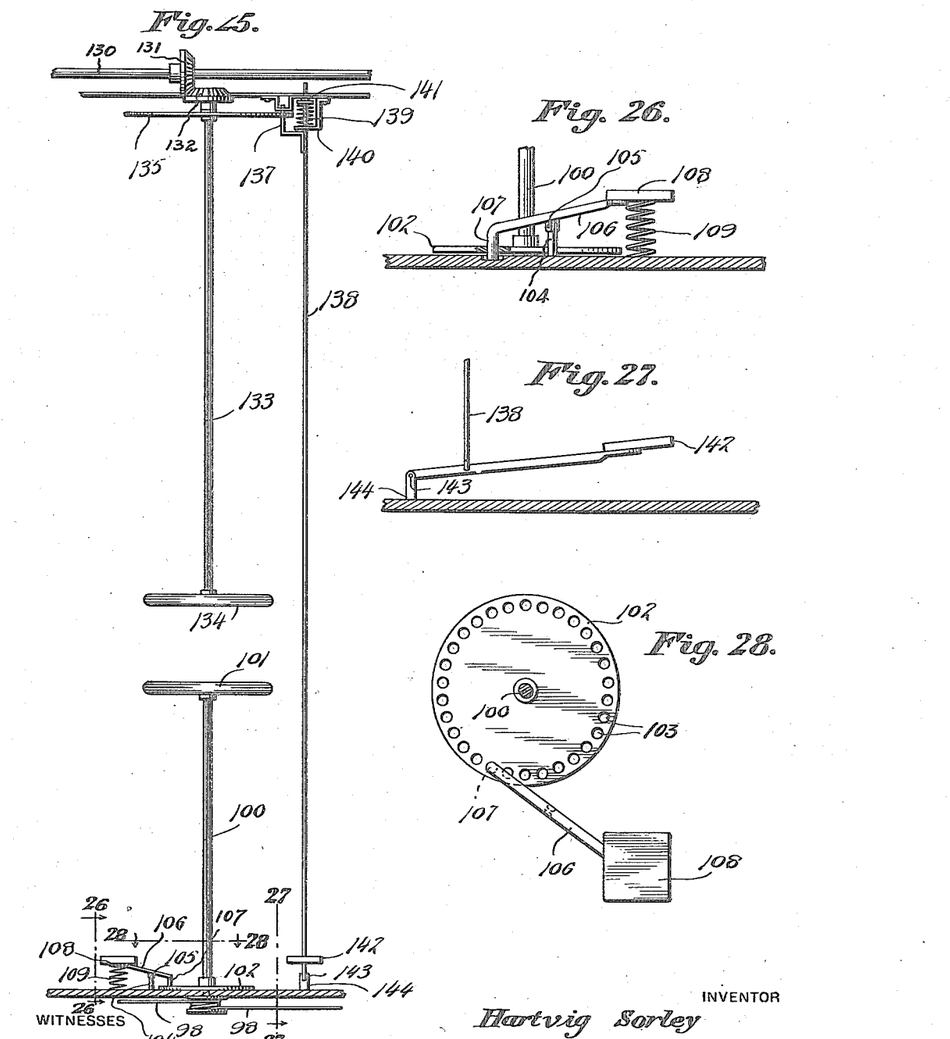
Fig. 25 is a sectional view showing the plane controlling means in section on the line 25—25 of Fig. 17.
Fig. 26 is a view, in section, on the line 26—26 of Fig. 25.
Fig. 27 is a view, in section, on the line 27—27 of Fig. 25.
Fig. 28 is a view, in section, on the line 28—28 of Fig. 25.
Figure 29:
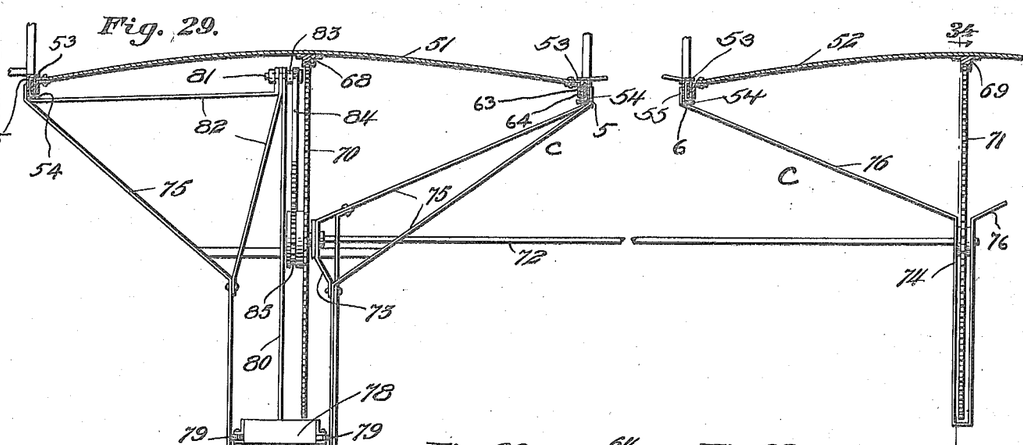
Fig. 29 is an enlarged view of one of the sliding planes and its complemental operating mechanism.
Figures 30, 31, 32, 33:
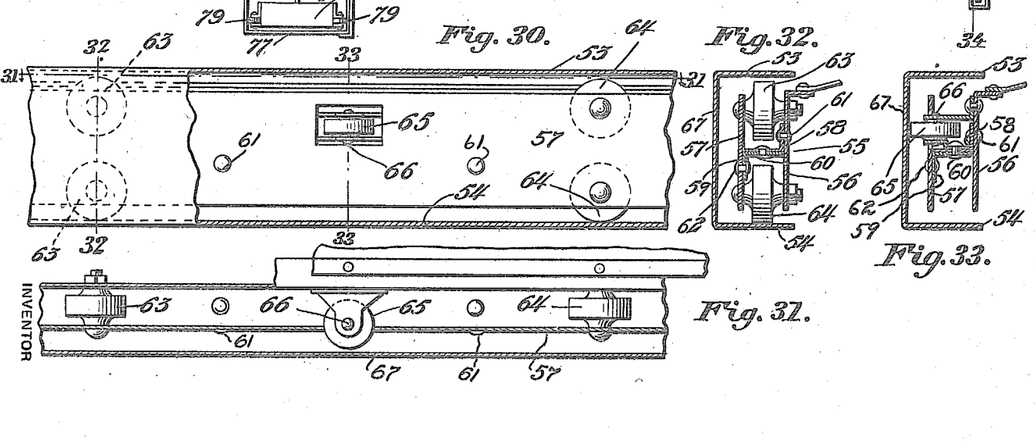
Fig. 30 is a view, partly in section, and partly in plan, of one of the tracks for the sliding plane.
Fig. 31 is a sectional view on the line 31—31 of Fig. 30.
Fig. 32 is a sectional view on the line 32—32 of Fig. 30.
Fig. 33 is a sectional view on the line 33—33 of Fig. 30.
Figures 34, 35, 36:
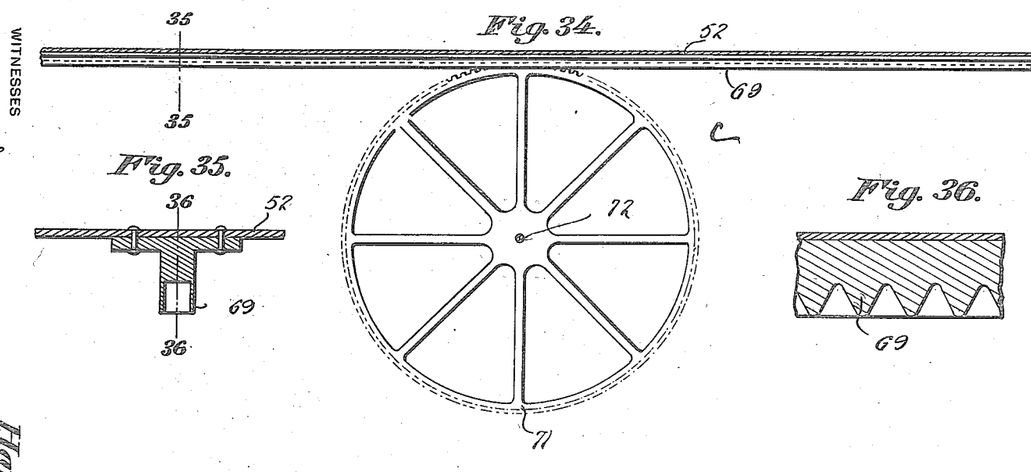
Fig. 34 is a sectional view on the line 34—34 of Fig. 29.
Fig. 35 is a sectional view on the line 35—35 of Fig. 34.
Fig. 36 is a sectional view on the line 36—36 of Fig. 35.
Figures 37, 39, 40, 41:
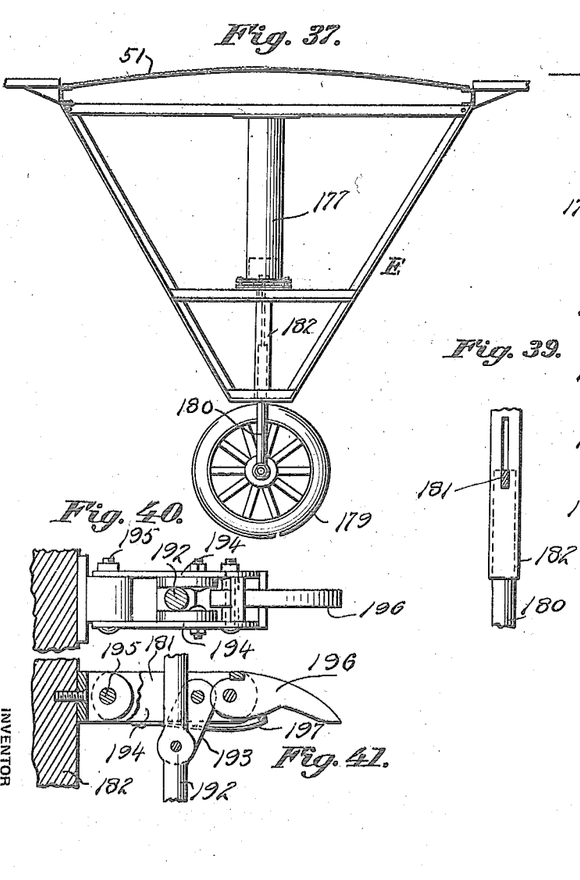
Fig. 37 is an enlarged vertical section showing the wheel frame and its complemental shock absorbing mechanism.
Fig. 39 is a detail sectional view on the line 39—39 of Fig. 38.
Fig. 40 is a sectional view on the line 40—40 of Fig. 38.
Fig. 41 is a side elevation on an enlarged scale of the mechanism shown in Fig. 40.

The gears connecting the said shafts hereinbefore enumerated may be suitably incased and journaled in boxes 167 as shown in Fig. 17.

Figure 38:
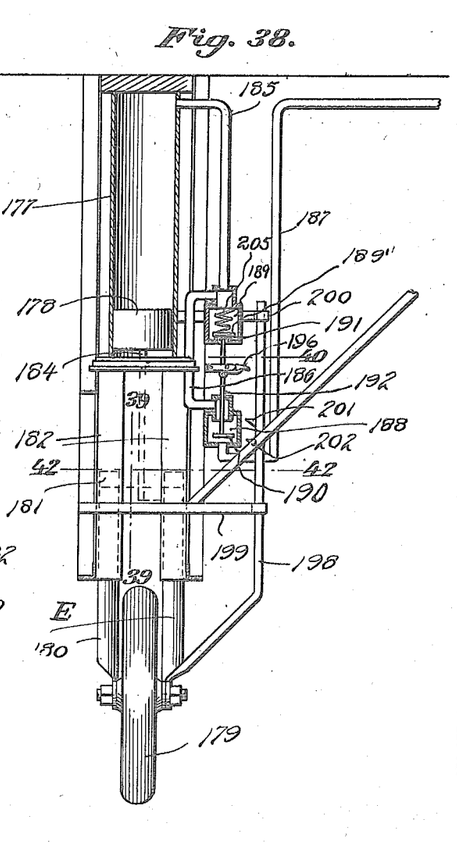
Fig. 38 is an enlarged front view of the mechanism shown in Fig. 37.
Figure 42:
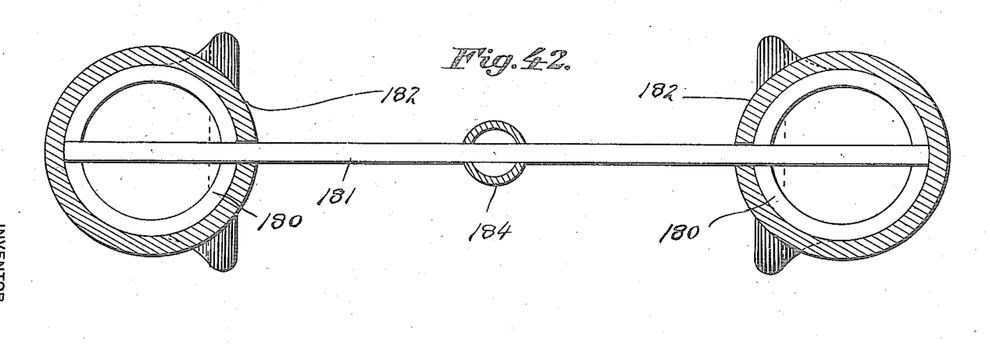
Fig. 42 is an enlarged section on the line 42—42 of Fig. 38.
Figures 43, 44, 45:
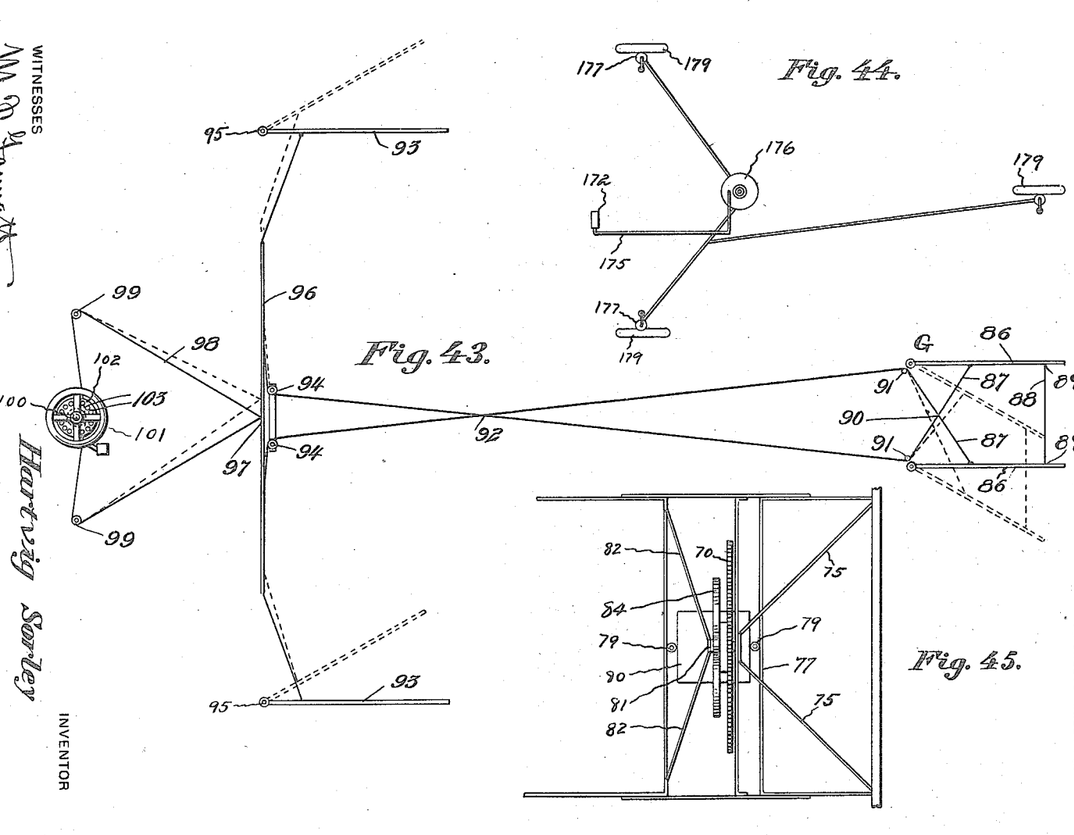
Fig. 43 is a diagrammatic plan view showing the aeroplane plane control.
Fig. 44 is a diagrammatic plan view showing the shock absorbing mechanism.
Fig. 45 is a diagrammatic view of the stabilizing mechanism.

With reference to the alighting and running mechanism E, it is to be noted that the shaft 26 is extended and carries a small worm gear 168. This gear 168 is controlled by a clutch 169 and meshes with a large gear 170 carried by a crank shaft 171 of a suitable air compressor 172 which is preferably of the duplex type and has the cylinders 173 and 174 provided with the usual air valves and the like and which have their outlets in a pipe 175. The pipe 175 connects with a compressed air reservoir 176 suitably located with respect to the center gravity of the machine so as not to overbalance the aeroplane during flight. The aeroplane is provided with a depending framework which carries the vertically disposed cylinders 177 having reciprocal therein pistons 178 and a cylinder is provided for each of the wheels 179 of the aeroplane. Forks 180 connect the axles of these wheels and are themselves connected by a cross guide member 181 which is reciprocal within guides 182 and is fixed to the piston rod 184 of the piston 178. The construction for each of the wheels 179 is identical and therefore, only one will be herein described. Connecting with the cylinder 177 at the top and above the piston 178 is an air conduit 185. A conduit 187 leads to a chamber 188 at the side of the cylinder 177, and a pipe 186 connects chamber 188 with a second chamber 189. These chambers contain pistons 190 and 191 respectively, which are connected by a reciprocatory rod 192, and the pistons are so arranged within their respective cylinders that when lowered, as shown in Fig. 38, air is free to pass from the reservoir through pipe 187, chamber 188, pipes 186 and 185, into cylinder 177 to force piston 178 and the running wheel carried thereby to the lowermost limit of its movement. When the pistons are moved to their opposite limits, the piston 191 closes the chamber 188, and the air passage is terminated, while the piston 190 opens a communication between pipe 185 and the port 189′ at the base of the cylinder 189. Obviously the air within the chamber 177 may then exhaust to the atmosphere, and the piston 178 may move inwardly. Immediately upon movement of the pistons 190—191 to initial position, air under pressure is admitted to chamber 177, and the piston 178 therein is forced outwardly.

The rod 192 is linked by means of a connection 193 to an arm 194 pivoted at 195 to one of the guides 182, and the said arm carries a finger 196 which may be depressed but can not be raised above horizontal, and is normally held in the latter position by a spring 197.

Connected with the fork 180 carrying the wheel 179 is a vertical member 198 guided in the members 199 and 200, and which carries a pair of spaced inwardly projecting lugs 201 and 202, the latter being adapted to engage with the finger 196. As the running wheel contacts the ground, the forks 180 will move inwardly, carrying with them the piston 178 and the member 198. The air within the cylinder 177 is compressed, and upon continued inward movement of the fork, the uppermost lug 201 engages the finger 196, raising the same and lifting the pistons 190 and 191. The piston 191 thus uncovers the exhaust opening 189′ in the chamber 189, permitting the compressed air within the cylinder 177 to exhaust, while at the same time the piston 190 seats against the upper end of the chamber 188 and prevents air flowing into the connecting pipe 186. This operation permits of the forks, wheel and piston moving further inwardly, and upon disengagement of the lug 201 from the finger 196, the spring 205 within the chamber 189 forces the rod 192 and its pistons downwardly to initial position, whereupon air pressure is again admitted to the cylinder 177. The above detailed operation is repeated upon further inward movement of the forks, the lowermost lug 202 operating upon the finger 196 in identically the same manner. From this arrangement, it is seen that I have provided a means for overcoming the violent shocks due to the aeroplane contacting with the ground when alighting, and which shocks so often result in serious injury, either to the occupants of the vehicles or to the mechanism of the latter. The particular arrangement of valves and operating mechanism permits of the device settling upon the ground easily and without the possibility of rebounding. After the shock absorbing operations have occurred, and the full weight of the machine is resting upon the wheels, the lowermost lug 202 will have moved upwardly and out of engagement with the finger 196. Immediately the pistons 190—191 will be lowered to the position shown in Fig. 38, whereupon air pressure from the tank 176 will force the piston 178 outwardly, and the vehicle will be maintained at the limit of its upward movement upon the wheel forks. It will be understood that the parts associated with the cushioning mechanism will be constructed of sufficient strength to withstand the strains and air pressure.

From the foregoing, the operation of the machine will be apparent. For instance, suppose it is desired to take flight, the engine is first started which sets in rotation all of the propellers and the machine courses over the ground; the shock absorbing means taking care that the course is smooth and that the machine glides lightly without undue vibration. As sufficient speed is attained, the auxiliary surface 110 and 111 are tilted which causes the aeroplane to mount in flight and then the other control elements are brought into play as required, except for the stabilizing mechanism which is automatically actuated by the oscillations of the machine.

While in the foregoing, I have described a specific embodiment of the present invention, it is, nevertheless, to be understood, that in practice, I may resort to such practical modifications thereof as fall within the scope of the invention is defined in the appended claims.

I claim:

1. In an aeroplane, a supporting structure having a fixed supporting area, and stabilizing mechanism including shiftable planes, channel shaped transverse guiding tracks for said planes, and roller bearings along the lateral edges of said planes and accommodated in the channels of said tracks.

2. In an aeroplane, a supporting structure having a fixed supporting area, and stabilizing mechanism including shiftable planes, channel shaped guiding tracks for said planes, and roller bearings along the lateral edges of said planes and accommodated in the channels of said tracks.

3. In an aeroplane, a supporting structure having a fixed supporting area, and stabilizing mechanism including shiftable planes, channel shaped transverse guiding tracks for said planes, and roller bearings carried along the lateral edges of said shiftable planes and accommodated in the channels of said tracks and presenting a rolling surface to all the walls thereof whereby friction is reduced to a minimum.

4. In an aeroplane, a supporting structure having a fixed supporting area, and stabilizing mechanism including shiftable planes, channel shaped guiding tracks for said planes, and roller bearings carried along the lateral edges of said shiftable planes and accommodated in the channels of said tracks and presenting a rolling surface to all the walls thereof whereby friction is reduced to a minimum.

5. In an aeroplane, a supporting structure having a fixed area, and stabilizing mechanism including shiftable planes, channel shaped transversely disposed guiding tracks for said planes, and roller bearings carried along the lateral edges of said planes, some of the rollers having their axes disposed in a horizontal plane parallel with the longitudinal axis of the aeroplane for bearing engagement with two walls of said tracks and others having their axes in a vertical plane for bearing engagement with the vertical walls of said tracks whereby each wall of said tracks has a rolling surface thereto thereby reducing friction to a minimum.

6. In an aeroplane, a supporting structure having a fixed supporting area, and stabilizing mechanism including shiftable planes, channel shaped transversely disposed guiding tracks for said planes, and roller bearings carried along the lateral edges of said planes, such bearings comprising vertically disposed flanges carried by the planes and having rollers journaled therein and projecting therebeyond for engagement with the channel walls of the tracks.

7. In an aeroplane, a supporting structure, and stabilizing mechanism including shiftable planes, tracks for guiding said planes, a rack fixed to each plane, and means for moving said planes, such means comprising gears meshing with said racks and interconnected by a common shaft, and gravity actuated means for moving said shaft dependent upon oscillations of the machine relatively to its longitudinal axis.

8. In an aeroplane, a supporting structure, and stabilizing mechanism including shiftable planes, tracks for guiding said planes, a rack fixed to each plane, and means for moving said planes, such means comprising gears meshing with said racks and interconnected by a common shaft, and a weight carrying arm acting on said shaft to move the latter as the said weight carrying arm is preponderated from side to side by the oscillations of the aeroplane about its longitudinal axis during flight, whereby equi-poise of the aeroplane is maintained.

9. In an aeroplane, a supporting structure, and stabilizing mechanism including shiftable planes, tracks for guiding said planes, a rack fixed to each plane, and means for moving said planes, such means comprising gears meshing with said racks and interconnected by a common shaft, and a sector in geared relation with said shaft and including means for moving said sector.

10. In an aeroplane, a supporting structure, and stabilizing mechanism including shiftable planes, tracks for guiding said planes, a rack fixed to each plane, and means for moving said planes, such means comprising gears meshing with said racks and interconnected by a common shaft, a sector in geared relation with said shaft, and a weight fixed to said sector whereby the latter is maintained in one position regardless of the oscillations of the aeroplane and thereby rotates said shaft to move said planes.

11. In an aeroplane, a supporting structure, and stabilizing mechanism including shiftable planes, tracks for guiding said planes, a rack fixed to each plane, and means for moving said planes, such means comprising gears meshing with said racks and inter-connected by a common shaft, a sector pivotally mounted and in geared relation with said shaft, and a weight dependent from the pivot of said sector and fixed to the latter whereby the said sector is maintained in one position regardless of the oscillations of the aeroplane about its longitudinal axis and thereby rotates said shaft to move said planes.

12. In an aeroplane, a supporting structure, and stabilizing mechanism including shiftable planes, tracks for guiding said planes, a rack fixed to each plane, and means for moving said planes, such means comprising the stabilizer frame, gears protected by said frame, a common shaft journaled in said frame and connecting said gears, a sector in geared relation with said shaft, and a lever arm fixed to said sector at its pivot and having a depending length equal or greater in dimension than the diameter of the arc of said sector.

13. In an aeroplane, a supporting structure, and stabilizing mechanism, including shiftable planes, tracks for guiding said planes, a rack fixed to each plane, and means for moving said planes, such means comprising a stabilizer frame depending from the supporting structure of the aeroplane, gears protected by said frame, a shaft common to all of said gears and journaled in said frame, a sector in geared relation with said shaft, and a lever arm fixed to said sector at its pivot and having a depending length equal or greater in dimension than the diameter of the arc of said sector.

14. In an aeroplane, a supporting structure, and stabilizing mechanism including shiftable planes, tracks for guiding said planes, a rack fixed to each plane, and means for moving said planes, such means comprising a stabilizer frame having a track depending from the supporting body of the aeroplane, inter-connected gears journaled in said track structure or frame and protected thereby, a sector in geared relation with said gears, and a preponderating weight guided by said track and for moving said sector.

15. In an aeroplane, a supporting structure, and stabilizing mechanism including shiftable planes, tracks for guiding said planes, a rack fixed to each plane, and means for moving said planes, such means comprising a stabilizer frame having a track depending from the supporting body of the aeroplane, inter-connected gears journaled in said track structure or frame and protected thereby, a sector in geared relation with said gears, and a weight guided by said track and movable in a vertical plane for actuating said sector.

16. In an aeroplane, a plurality of main supporting surfaces, tilting auxiliary surfaces above said main surfaces, manual means for tilting said auxiliary surfaces, and friction means for preventing free movement of such auxiliary surfaces.

17. In an aeroplane, a plurality of main supporting surfaces, auxiliary surfaces mounted thereabove and tiltable to preserve longitudinal stability, and friction means operated by the tilting movement of said auxiliary surfaces to prevent undue movement thereof.

18. In an aeroplane, main supporting surfaces, auxiliary concaved surfaces disposed laterally above said main surfaces, a laterally disposed driving shaft, a driven shaft for each auxiliary surface, and intermediary shafts connecting said driving and driven shafts whereby said auxiliary surfaces may be simultaneously moved.

In testimony whereof I affix my signature in presence of two witnesses.

HARTVIG SORLEY.

Witnesses:
O. A. ANDERSON,
GUSTAF H. SCHEFSTROM.